(12) United States Patent
Streiff

(10) Patent No.: US 7,942,955 B2
(45) Date of Patent: May 17, 2011

(54) STATIC DEVOLATILISATION APPARATUS AND METHOD FOR A LIQUID CONTAINING POLYMERS

(75) Inventor: Felix A Streiff, Humlikon (CH)

(73) Assignee: Sulzer Chemtech AG, Winterthur (CH)

( * ) Notice: Subject to any disclaimer, the term of this patent is extended or adjusted under 35 U.S.C. 154(b) by 1013 days.

(21) Appl. No.: 11/641,291

(22) Filed: Dec. 19, 2006

(65) Prior Publication Data

US 2007/0137488 A1 Jun. 21, 2007

(30) Foreign Application Priority Data

Dec. 21, 2005 (EP) .................................... 05405711

(51) Int. Cl.
*B01D 19/00* (2006.01)

(52) U.S. Cl. ............... 96/194; 96/198; 96/201; 95/260; 95/266; 528/480; 159/22; 159/28.6

(58) Field of Classification Search .................... 96/115, 96/176, 193, 205, 206, 207, 194, 197, 198, 96/199, 200, 201, 202, 203, 204, 215, 218, 96/220; 95/251, 252, 260, 266, 262, 247–250; 210/188, 175, 180; 528/483, 501, 502 R; 159/2.1, 2.2, 2.3, 23, 28.6, 43.1, 47.1
See application file for complete search history.

(56) References Cited

U.S. PATENT DOCUMENTS

| | | | | |
|---|---|---|---|---|
| 1,416,632 A | * | 5/1922 | Fothergill | 95/258 |
| 1,511,876 A | * | 10/1924 | Ehrhart | 96/162 |
| 1,518,784 A | * | 12/1924 | Gibson | 95/244 |
| 2,235,593 A | * | 3/1941 | Schneider | 261/89 |
| 2,282,622 A | * | 5/1942 | Mize | 426/569 |
| 2,308,721 A | * | 1/1943 | Sebald | 96/203 |
| 2,313,175 A | * | 3/1943 | Scott et al. | 203/89 |
| 2,452,716 A | * | 11/1948 | Bergquist | 95/264 |
| 2,564,583 A | * | 8/1951 | Sebald | 261/115 |
| 2,564,584 A | * | 8/1951 | Sebald | 261/115 |
| 2,738,852 A | * | 3/1956 | Freneau et al. | 261/21 |
| 2,887,955 A | * | 5/1959 | Owen | 417/404 |
| 2,979,156 A | * | 4/1961 | Sebald | 96/198 |
| 3,113,871 A | * | 12/1963 | Webster | 426/475 |
| 3,213,594 A | * | 10/1965 | Long | 96/165 |
| 3,257,173 A | * | 6/1966 | Parnell | 422/137 |
| 3,325,974 A | * | 6/1967 | Griffin, III et al. | 96/162 |
| 3,494,101 A | * | 2/1970 | Wikdahl | 95/158 |
| 3,793,805 A | * | 2/1974 | Hoffman | 95/256 |

(Continued)

FOREIGN PATENT DOCUMENTS

CA 1251403 * 3/1989

(Continued)

*Primary Examiner* — Duane Smith
*Assistant Examiner* — Thomas McKenzie
(74) *Attorney, Agent, or Firm* — Francis C. Hano; Carella, Byrne et al

(57) ABSTRACT

The static devolatilisation apparatus serves to treat a liquid (7) containing polymers for the purpose of polymer devolatilisation. Volatile components are separated from the polymers in that the liquid standing under pressure is expanded in at least one phase separation chamber (2) in the upper regions of the container (10). A discharge pump (3) for the devolatilised polymer is located at the base of a sump region. An extraction line (4) for gases (8) is located in the upper region. The separation chamber includes an inlet (20) for the liquid to be treated, lower openings (210) for polymer discharge and at least a single upper opening (220) for gas discharge.

8 Claims, 2 Drawing Sheets

U.S. PATENT DOCUMENTS

| | | | |
|---|---|---|---|
| 3,834,133 A * | 9/1974 | Bow .................. | 96/181 |
| 3,853,513 A * | 12/1974 | Carson ............... | 96/189 |
| 3,853,672 A * | 12/1974 | Gordon et al. ........ | 159/17.3 |
| 3,926,594 A * | 12/1975 | Seib et al. ........... | 96/220 |
| 3,966,538 A * | 6/1976 | Hagberg .............. | 159/2.1 |
| 4,312,644 A * | 1/1982 | Avenel ................ | 96/163 |
| 4,385,908 A * | 5/1983 | Carmichael ........... | 95/24 |
| 4,392,874 A * | 7/1983 | Yamauchi ............. | 96/200 |
| 4,624,686 A * | 11/1986 | Andrieux et al. ...... | 96/203 |
| 4,701,191 A * | 10/1987 | Kreuwel et al. ....... | 96/203 |
| 4,744,957 A * | 5/1988 | Imai et al. ........... | 422/138 |
| 4,808,262 A * | 2/1989 | Aneja et al. .......... | 159/47.1 |
| 4,921,400 A * | 5/1990 | Niskanen ............. | 415/169.1 |
| 4,934,433 A * | 6/1990 | Aboul-Nasr .......... | 159/43.1 |
| 5,084,134 A * | 1/1992 | Mattiussi et al. ...... | 159/47.1 |
| 5,510,019 A * | 4/1996 | Yabumoto et al. ..... | 210/137 |
| 6,345,908 B1 * | 2/2002 | Gmeiner .............. | 366/139 |
| 6,712,281 B2 * | 3/2004 | Hirota et al. .......... | 236/92 B |
| 6,932,889 B1 * | 8/2005 | Holcomb ............. | 203/11 |
| 7,087,139 B1 * | 8/2006 | Berti et al. ........... | 159/2.3 |
| 2006/0207795 A1 * | 9/2006 | Kinder et al. ......... | 175/38 |
| 2007/0137488 A1 * | 6/2007 | Streiff ................. | 96/218 |

FOREIGN PATENT DOCUMENTS

DE        2331314     *   1/1975

* cited by examiner

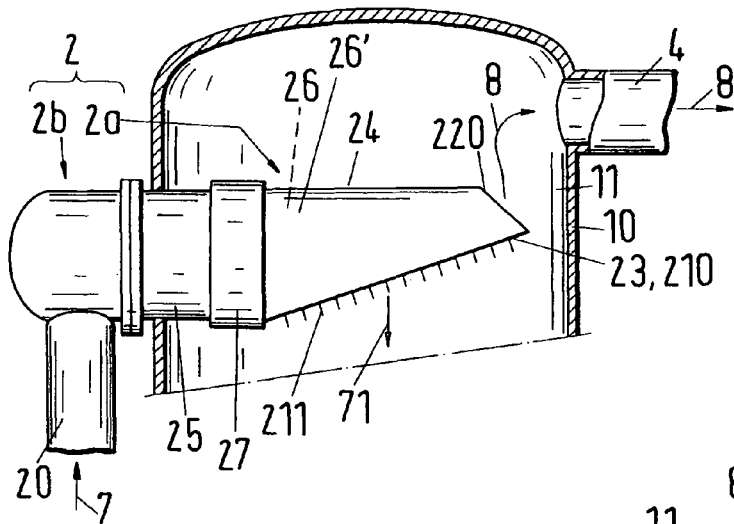
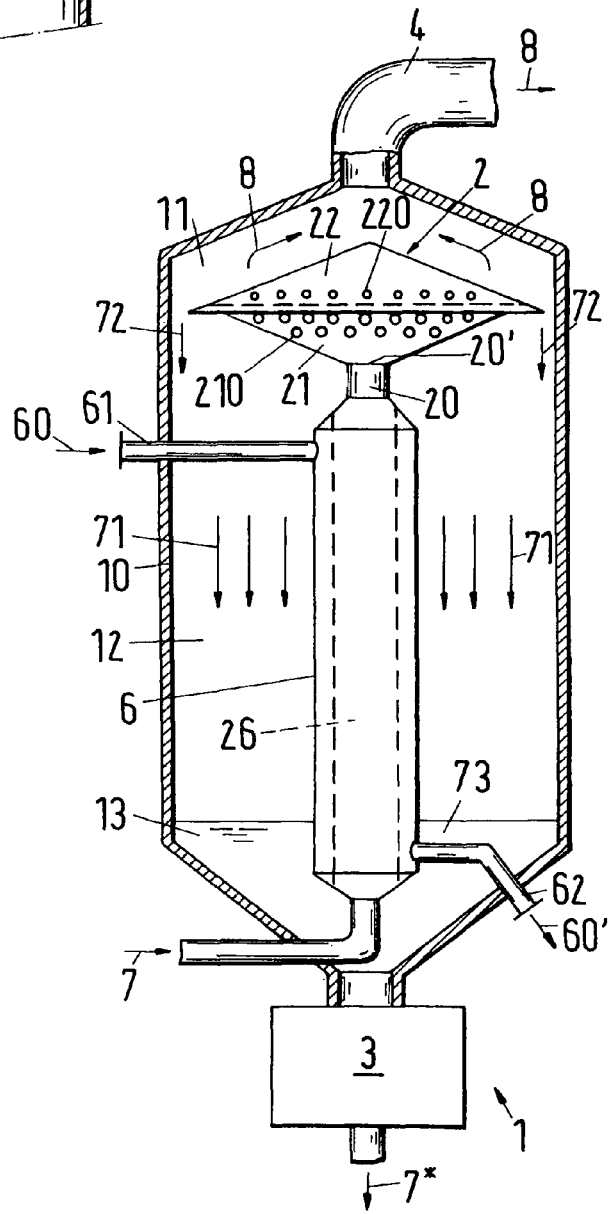
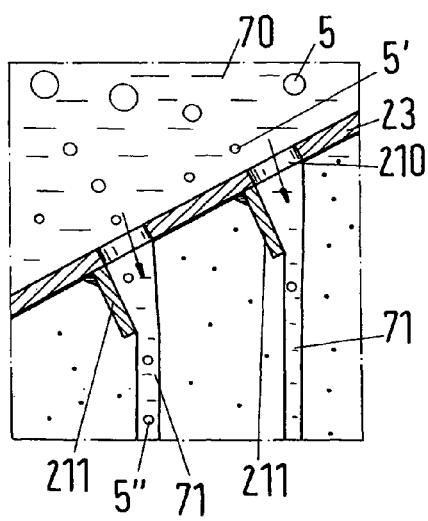

STATIC DEVOLATILISATION APPARATUS AND METHOD FOR A LIQUID CONTAINING POLYMERS

This invention relates to an apparatus and method for the static devolatilisation of a liquid containing polymers. More particularly, this invention relates to a method and apparatus for the separation of volatile components from a polymer.

As is known, polymer devolatilisation is an important part process in the manufacture, and in particular, the treatment of plastics that is critical and therefore complex in many cases. A variety of devolatilisation processes are available from which a suitable process or a combination of processes of this type can be selected with reference to the liquid to be treated. The liquid to be treated is, for example, a polymer solution in which a solvent forms the volatile component or a polymer melt with monomers as volatile components. The choice can be made empirically in this process on the basis of experience and supported by experiments.

Machine apparati, for example extruders or other devolatilisation apparati working with rotating components, are frequently used. However, apparati are also used, namely static devolatilisation apparati, in which only pumps (discharge pumps for devolatilised polymer, pumps for heat transfer media) form the machine components.

It is the object of the invention to provide a further static devolatilisation apparatus which is suitable for the devolatilisation of a liquid containing polymers.

It is another object of the invention to simplify the static devolitilisation of a liquid containing a polymer.

Briefly, the invention provides a method of devolitilising a liquid containing a polymer wherein the liquid is foamed by expansion and a mixture of liberated gas and low-gas polymer is produced. (A vapor is to be understood as a gas here and the low-gas polymer as a liquid which contains a residue of volatile components in dissolved form, on the one hand, and in the form of fine bubbles, on the other hand, whose diameters are distributed over a relatively wide range of values.)

The invention also provides a static devolitilisation apparatus for performing the method which is constructed with a container for receiving a liquid containing a polymer wherein the said container has a lower sump region for collecting devolatilised polymer, an upper region for discharging gas and a central region. The apparatus also has a discharge pump located at a base of the sump region for discharging devolatilised polymer and an extraction line located at the upper region for discharging gas.

In addition, the apparatus includes at least one phase separation chamber in the upper region of the container that has an inlet for the liquid to be treated, a plurality of polymer discharge openings in a lower portion for discharging polymer downwardly towards the sump region and at least a single gas discharge opening in an upper portion for discharging gas upwardly to the extraction line. During operation, the liquid to be treated is delivered into the separation chamber and foamed by expansion to produce a mixture of liberated gas and low-gas polymer. The resulting fractions are then discharged through the respective openings in the chamber.

In particular, the liquid within the phase separation chamber is foamed to produce a gas-rich fraction and a low-gas fraction. The gas-rich fraction is discharged from the phase separation chamber upwardly into the upper region of the container through at least the one gas discharge opening and the low-gas fraction is discharged from the phase separation chamber downwardly into the lower sump region of the container through the polymer discharge openings.

These and other objects and advantages of the invention will become more apparent from the following detailed description taken in conjunction with the accompanying drawings wherein:

FIG. 1 illustrates a first embodiment of the devolatilisation apparatus in accordance with the invention;

FIG. 2 illustrates the upper (head) region of a second devolatilisation apparatus in accordance with the invention;

FIG. 3 illustrates a detail of the devolatilisation apparatus of FIG. 2;

Figure 4:
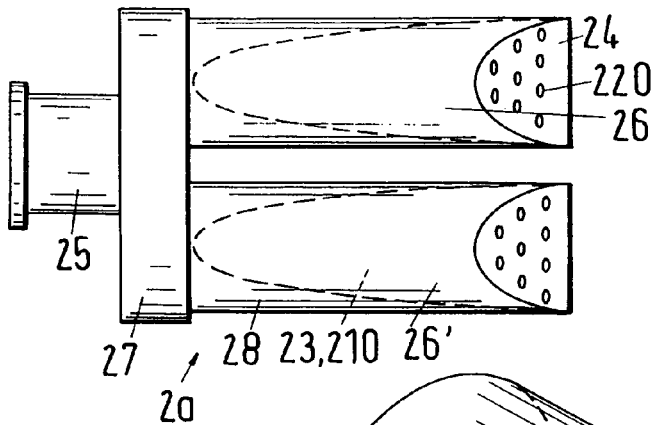
FIG. 4 illustrates a plan view of a phase separation chamber used in the devolatilisation apparatus of FIG. 2.

Referring to FIG. 1, the static devolatilisation apparatus 1 includes a container 10 for receiving a liquid containing a polymer. The interior space of the container 10 includes an upper region (head) 11 for discharging gas, a central region 12 and a lower sump region 13 for collecting devolatilised polymer, all disposed on a vertical axis.

A discharge pump 3 is located at a base of the sump region 13 for discharging devolatilised polymer thereform and an extraction line 4 is located at the upper region 11 for discharging gas therefrom.

At least one phase separation chamber 2 is disposed in the upper region of the container 10 that includes an inlet 20 with an opening 20' for the liquid to be treated, a plurality of polymer discharge openings 210 in a lower portion for discharging polymer downwardly towards the sump region 13 and at least a single gas discharge opening 220 in an upper portion for discharging gas upwardly to the extraction line 4. The total cross-sectional area of the gas discharge opening(s) is smaller than the total cross sectional area of the polymer discharge openings and is at least 5% of the total cross sectional area of the polymer discharge openings.

During operation, highly viscous liquid 7 containing polymers is treated in which volatile components are separated from the polymers by means of an expansion evaporation. As with already known methods, the gases formed from the volatile components can be liberated in part from falling films and/or strands in the container 10 which can be evacuated as a rule. The devolatilised or partly devolatilised polymer 73 is collected in the sump region 13. Devolatilised polymer 7* is removed from the container 10 using a device (not shown) for the regulated level maintenance of the polymer 73 in the sump region 13 by means of the discharge pump 3. The devolatilised polymer 7* can still contain residues of volatile components which—if necessary—can be removed in a further devolatilisation apparatus (not shown).

Devolatilisation takes place in the phase separation chamber 2 due to foam formation. A mean dwell time in the phase separation chamber 2 of at least one minute, preferably two minutes, is to be provided for the development of the foam, with this mean dwell time being equal to the quotient from the liquid amount contained in the phase separation chamber 2 and to the throughput and the chamber having a maximum filling.

A gas-rich fraction, namely a foam with larger or smaller bubbles, exits the phase separation chamber 2 through the upper openings 220 (gas discharge region), with the bubbles bursting so that their content, which consists of volatile components, is liberated. The larger the spacing is between the inlet opening 20' and the gas discharge region and the longer the mean dwell time, the longer the period during which the gas portion of the gas-rich fraction can increase. The volatile components are removed from the container 10 by the extraction line 4 as a gas flow 8 (arrows 8).

The wall of the phase separation chamber 2 is composed of two umbrella-shaped parts, a lower part 21 and an upper part 22, in the particular embodiment of FIG. 1. A stationary gas bubble can form beneath the convex central region of the upper umbrella-shaped part 22, with the gas bubble also being able to be a foam with a very low liquid portion.

A low-gas fraction, which contains a residue of volatile components in dissolved form and in the form of fine bubbles, exits the phase separation chamber 2 through the lower openings 210. As is known from the book "Polymer Devolatilization" (edited by Ramon J. Albalak; Marcel Dekker, Inc.; 1996), foamed plastics show a structure with a self-similar, fractal-like geometry of diameters and distribution of the bubbles (Albalek et al. "Study of Devolatilization by SEM", FIG. 9). The bubble diameters are therefore distributed over a relatively wide range of values. (In the cited book, further important facts on polymer devolatilisation are described as well as devolatilisation apparati.)

The gas discharge region (openings 220) and the polymer discharge region (openings 210) are arranged in marginal regions of the umbrella-like parts 21 and 22 respectively. Polymer 72 which exits the gas discharge region together with the gas flow 8 flows away downwardly as indicated by the arrows.

The lower openings 210 are made in hole or slit form for a further devolatilisation. The low-gas fraction flows out of the polymer discharge region divided into strand-like (or film-like) part flows 71. The part flows 71 move in a directly falling manner or delayed by installations (not shown) into the sump region 13 and, in this process, release volatile components into the central region 12. The gas liberated in this process is discharged via the extraction line 4.

Pressure differences are present between the interior space of the phase separation chamber 2 and the central region 12 of the container 10. If the devolatilisation is operated at a low pressure (produced by a vacuum pump), the maximum pressure difference at the bottommost openings 210 should amount to 100 mbar at most. At a high devolatilisation pressure, the maximum pressure difference can also be higher, for example 500 mbar. The pressure differences drive the two fractions from the separation chamber 2 through the openings 210 and 220, on the one hand, and allow the bubbles to expand further, on the other hand, so that they burst. The part flows 71 of the low-gas fraction should have a throughput of at most 15 kg/h. At larger throughputs, the gas portion of the low-gas fraction would be undesirably high. In an industrial plant, the total throughput through the polymer discharge region as a rule has a value in the order of magnitude of 1 to 10 kg/h.

As illustrated if FIG. 1, the inlet 20 to the phase separation chamber 2 is arranged inside the container 10 and is made partly as a heat exchanger 6 (heat transfer medium 60 or 60', pre-run 61, post-run 62). Installations in the form of static mixer elements or heat-conducting ribs are advantageously arranged in the inlet 20. i.e. in a section 26 of the inlet 20 located in the heat exchanger 6. The installations contribute to a heat transfer from the heat transfer medium 60 into the liquid to be treated. The heat exchanger 6 can also emit heat to the central space 12; thermal insulation is thus not necessary.

Referring to FIG. 2, wherein like reference characters indicate like parts as above, the head region 11 of a modified devolatilisation apparatus 1 has the inlet 20 to the phase separation chamber 2 located outside the container 10. The phase separation chamber 2 thus includes a part 2a arranged in the container 10 and a part 2b arranged outside the container 10. The inlet 20 advantageously leads through a heat exchanger (not shown) which can be made similar to the heat exchanger 6 (but with a thermally insulating jacket).

The inner chamber part 2a is made with two arms as shown in FIG. 4. Two arms 26 and 26' are connected to a tube piece 25 at the inlet side via a distributor piece 27. The walls of the arms 26, 26' are each composed of two perforated plates 23 and 24 and a tube part 28. The perforated plate 23 forms the polymer discharge region with the lower chamber openings 210 and the perforated plate 24 forms the gas discharge region with the upper chamber openings 220. The gas discharge region can also consist of only one opening instead of the perforated plate 24 if the polymer to be devolatilised has a relatively low viscosity.

FIG. 3 shows a part cross-section through the polymer discharge region. The liquid 70 to be treated flows over the perforated plate 23 after being foamed and contains bubbles 5, 5' with differently sized diameters. Due to buoyancy, the larger bubbles 5 move upwardly faster than the smaller bubbles 5', which dwell longer in the lower regions. The part flows 71 of the low-gas fraction being discharged from the chamber openings 210 contain very small bubbles 5" which are deformed by a stretching of the film-like or strand-like part flows 71 such that they open and can emit their gaseous content into the central region 12.

A deflection element 211 can be arranged at the outlet of each of the respective lower chamber openings 210 (see FIG. 3), by means of which the discharged part flow 71 is guided away from the chamber wall.

It can be advantageous to distribute the holes 210 of the polymer discharge region in an irregular manner so that a variable hole density is present, for example a graduation of this density at which the density increases upwardly. A longer dwell time of the liquid 7 to be treated in the phase separation chamber 2 can thereby be achieved.

A variable hole density can also be provided in the gas discharge region. The openings 210 of the polymer discharge region and the openings 220 of the gas discharge region are each of a different size or of the same sizes, with the openings 210 and 220 being able to have different shapes. The hole density, the hole diameter and also the thickness of the perforated plates can be matched to a provided throughput or throughput range of the devolatilisation apparatus 1 and/or to the viscosity range of the polymer.

Figure 5:
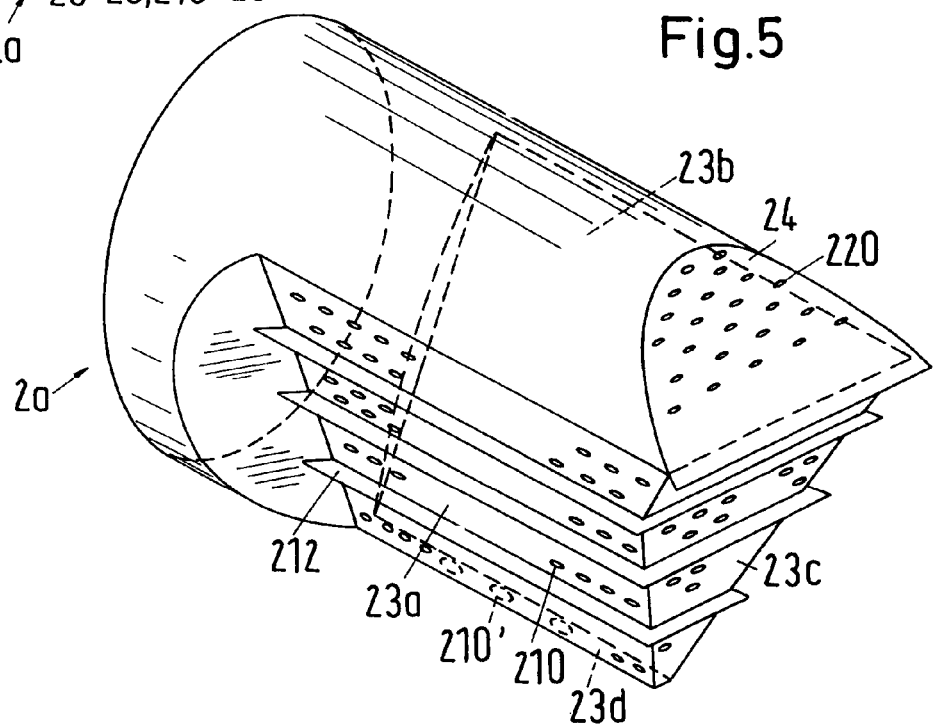
FIG. 5 illustrates a further phase separation chamber in accordance with the invention.

In the variant of the phase separation chamber 2 shown in FIG. 5, wherein like reference characters indicate like parts as above, three lower perforated metal sheets 23a, 23b and 23c (with the lower openings 210) form a polymer discharge region which is made in wedge shape. The perforated metal sheet 23c forms a projecting wall piece. Ribs 212 deflect the discharged polymer away from the perforated plates 23a, 23b and 23c. A sheet metal strip 23d terminates the chamber 2 towards the bottom and forms the bottommost positions of the chamber 2. At least one opening (210') is preferably arranged at these bottommost positions through which the chamber 2 can run empty on an interruption of operation. After a restart of operation, the devolatilisation apparatus 1 can thus be restarted again without problem.

The liquid 7 to be treated can be expanded before entry into the phase separation chamber 2 by expansion devices, namely by a valve, a diaphragm or a static mixer, from a relatively high pressure of, for example, 3 bar to the pressure in the interior space of the phase separation chamber 2 (for example, 1 bar).

Figure 6:
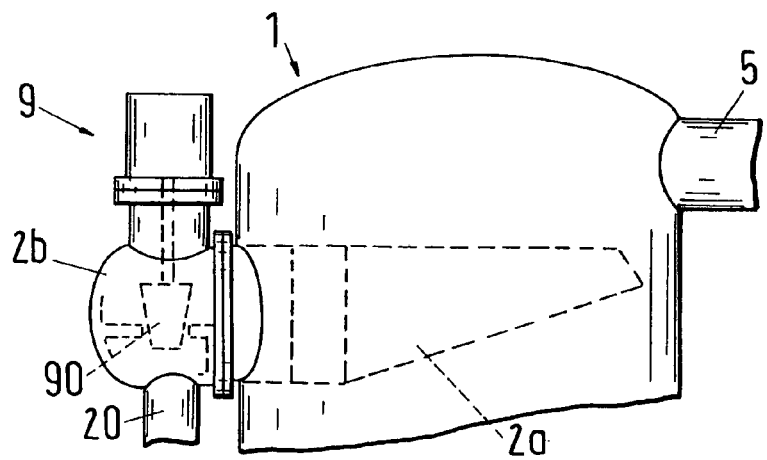
FIG. 6 illustrates a variant of the devolatilisation apparatus of FIG. 2.

Referring to FIG. 6, wherein like reference characters indicate like parts as above, an expansion device in the form of a valve 9 with a valve body 90 is integrated into the outer part 2*b* of the phase separation chamber 2 for an abrupt expansion of the liquid 7. The expansion device can be integrated in the outside part 2*b* of the phase chamber 2 as shown or at any other position in the inlet 20.

The polymer devolatilisation in accordance with the invention can also be carried out using a stripping agent (e.g. water, carbon dioxide, nitrogen). The stripping agent is mixed into the liquid 7 to be treated before entry into the phase separation chamber 2, with a static mixer preferably being used for this purpose. The stripping agent is advantageously mixed with the liquid 7 to be treated at an elevated pressure, i.e. before an expansion device. If the mixing is not sufficient, damage due to abruptly expanding bubbles can arise on expansion.

The invention thus provides an apparatus and a method for the static devolitilisation of a liquid containing a polymer in a simple economical manner.

What is claimed is:

1. A static devolatilisation apparatus comprising
a container for receiving a liquid containing a polymer, said container having a lower sump region for collecting devolatilised polymer, an upper region for discharging gas and a central region between said lower region and said upper region;
a heat exchanger in said container for passing the liquid to be treated in heat exchange relation with a heating medium for transfer of heat into the liquid;
a discharge pump located at a base of said sump region for discharging devolatilised polymer therefrom,
an extraction line located at said upper region for discharging gas therefrom; and
at least one self-contained phase separation chamber in said upper region of said container including an inlet connected to an upper end of said heat exchanger for receiving heated liquid therefrom, a plurality of polymer discharge openings in a lower umbrella shaped portion for discharging polymer downwardly towards said sump region and at least a single gas discharge opening in an upper umbrella shaped portion for discharging gas upwardly to said extraction line.

2. A static devolatilisation apparatus comprising
a container for receiving a liquid containing a polymer, said container having a lower sump region for collecting devolatilised polymer, an upper region for discharging gas and a central region between said lower region and said upper region;
a heat exchanger outside said container for passing the liquid to be treated in heat exchange relation with a heating medium for transfer of heat into the liquid;
a discharge pump located at a base of said sump region for discharging devolatilised polymer therefrom;
an extraction line located at said upper region for discharging gas therefrom; and
at least one sell-contained phase separation chamber in said upper region of said container including an inlet outside said container and connected to said heat exchanger for receiving heated liquid therefrom, a plurality of polymer discharge openings in a lower portion for discharging polymer downwardly towards said sump region and at least a single gas discharge opening in an upper portion for discharging gas upwardly to said extraction line.

3. A static devolatilisation apparatus as set forth in claim 2 wherein said phase separation chamber has at least one plate in said lower portion disposed in an downwardly facing direction with said polymer discharge openings therein and a plate in said upper portion disposed in an upwardly facing direction with said gas discharge opening therein.

4. A static devolatilisation apparatus as set forth in claim 2 further comprising a plurality of deflection elements on said lower portion of said phase separation chamber, each said deflection element being disposed at a lowermost end of a respective polymer discharge opening to guide discharged polymer away from said lower portion.

5. A static devolatilisation apparatus as set forth in claim 4 wherein at least one of said polymer discharge openings is disposed at a bottommost position of said phase separation chamber to allow said phase separation chamber to run empty.

6. A static devolatilisation apparatus as set forth in claim 2 wherein the total cross-sectional area of said gas discharge opening is smaller than the total cross-sectional area of said polymer discharge openings and is at least 5% of the total cross-sectional area of said polymer discharge openings.

7. A static devolatilisation apparatus as set forth in claim 2 further comprising an expansion device upstream of said phase separation chamber for expanding the liquid to be treated before entry into said phase separation chamber from a relatively high pressure to a lower pressure.

8. A static devolatilisation apparatus as set forth in claim 7 wherein said inlet is disposed outside said container and said expansion device is a valve disposed within said inlet outside said container.

* * * * *